United States Patent [19]

Hareng et al.

[11] 4,310,858

[45] Jan. 12, 1982

[54] TELECOPYING PROCESS EMPLOYING A CELL HAVING A SMECTIC LIQUID CRYSTAL AND A TRANSMITTER-RECEIVER TELECOPIER EMPLOYING SAID PROCESS

[75] Inventors: Michel Hareng; Serge Le Berre; Pierre Leclerc, all of Paris, France

[73] Assignee: Thomson-CSF, Paris, France

[21] Appl. No.: 129,972

[22] PCT Filed: Nov. 30, 1978

[86] PCT No.: PCT/FR78/00044

§ 371 Date: Aug. 1, 1979

§ 102(e) Date: Aug. 1, 1979

[87] PCT Pub. No.: WO79/00333

PCT Pub. Date: Jun. 14, 1979

[30] Foreign Application Priority Data

Dec. 1, 1977 [FR] France .............................. 77 36223

[51] Int. Cl.³ .............................................. H04N 1/24
[52] U.S. Cl. .................................... 358/302; 340/713; 340/796; 355/5; 358/286; 358/293; 358/294; 358/296; 350/350 S

[58] Field of Search .............. 350/350 S; 358/285, 358/296, 302, 293, 294; 355/5; 340/713, 794, 795, 796

[56] References Cited

U.S. PATENT DOCUMENTS

| 3,796,999 | 3/1974 | Kahn | 350/350 S |
| 3,957,347 | 5/1976 | Saeva | 350/350 S |
| 4,040,047 | 8/1977 | Hareng | 350/350 S |
| 4,202,010 | 5/1980 | Hareng | 358/56 |

Primary Examiner—Howard Britton
Attorney, Agent, or Firm—Cushman, Darby & Cushman

[57] ABSTRACT

A telecopying process and a transmitter-receiver telecopier employing this process. A cell having a smectic liquid crystal is used for recording by thermo-optically forming an intermediate image of a linear element (column portion or a whole line) of the transmitted document, which image is thereafter projected onto a photosensitive surface. The same optical system permits, when transmitting, the reading of this linear element by a mosaic of detectors and, when receiving, the projection onto the photosensitive surface of the intermediate image recorded in the cell.

4 Claims, 10 Drawing Figures

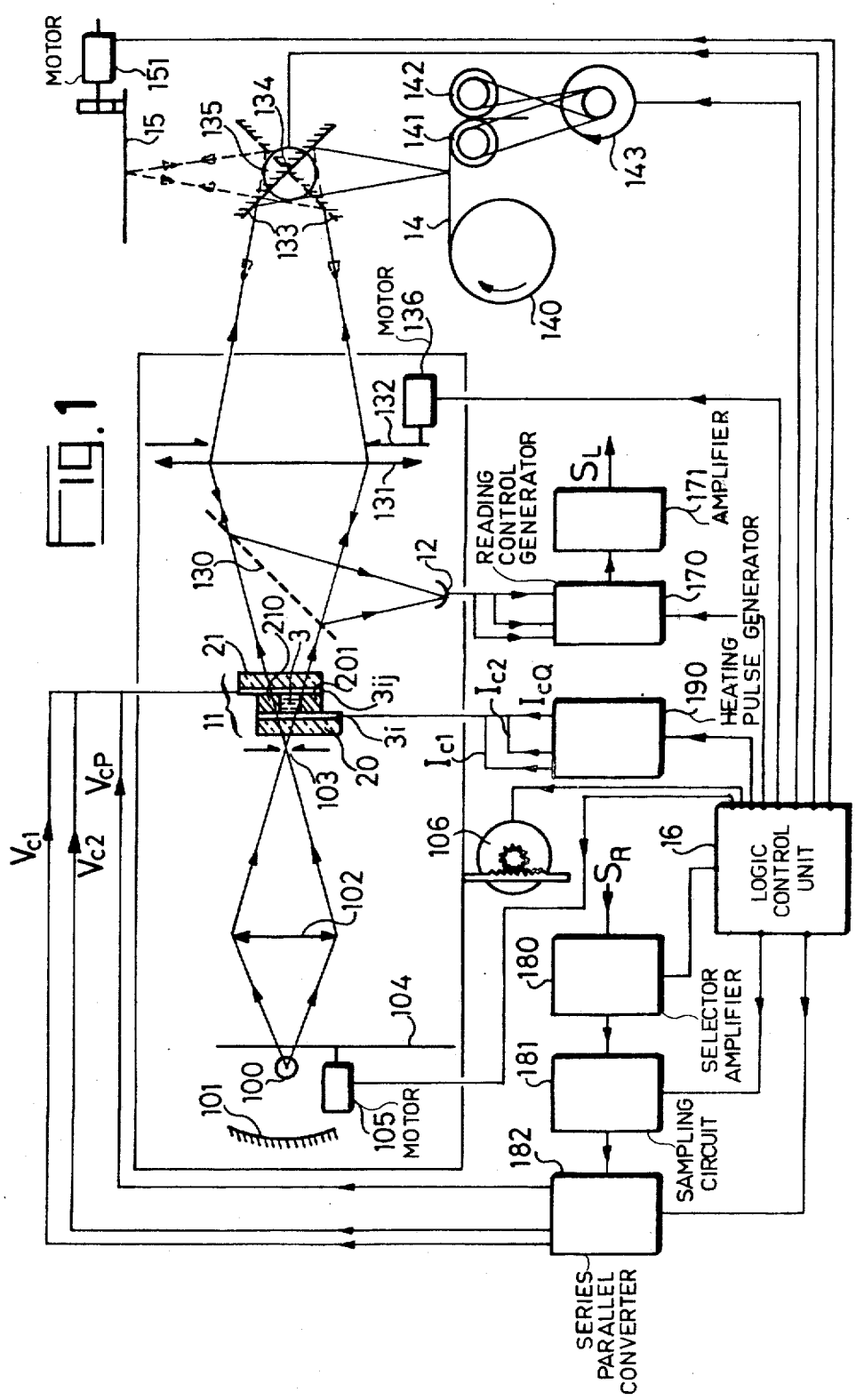

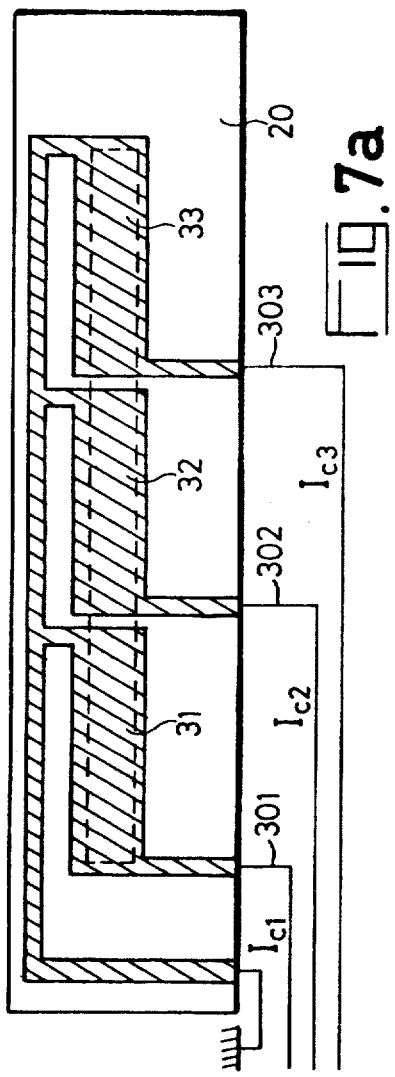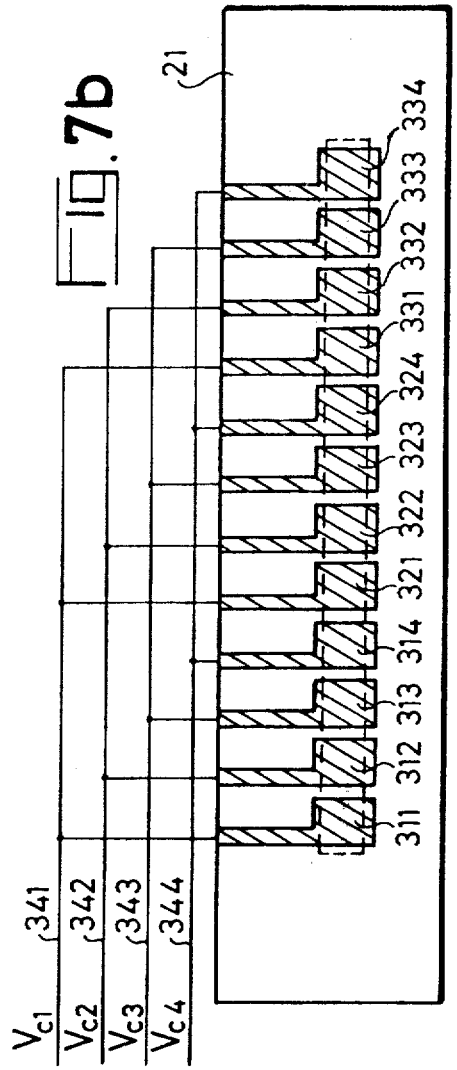

TELECOPYING PROCESS EMPLOYING A CELL HAVING A SMECTIC LIQUID CRYSTAL AND A TRANSMITTER-RECEIVER TELECOPIER EMPLOYING SAID PROCESS

The present invention relates to a transmitter-receiver telecopier and more particularly to a telecopier employing a film of a mesomorphic material having a smectic phase for the intermediate recording of a linear element of the document to be telecopied, this intermediate recording being thereafter projected onto a photosensitive surface. The device is designed to operate both for transmission and reception and to be coupled just as well to the ordinary telephone network as to high-rate date transmission lines.

Practically all of the prior art use a direct recording. The video signal resulting from the dot-by-dot and line-by-line scanning of the document to be telecopied, is applied to an electrode having the shape of a fine point which moves in the immediate vicinity of a sensitive paper so as to write a succession of dots thereon. The paper is printed by various processes. The paper may be provided with a subjacent conductive layer formed by carbon black or an electrolyte; in the first case, a voltage applied to the electrode produces a spark which pierces the paper and causes the carbon black to appear; in the second case, the current issuing from the electrode results in the migration of coloured metal ions to the surface of the paper. A thermosensitive paper, obtained by the impregnation of heat-decomposable fatty acid salts, may also be employed; the passage of the current heats the electrode and the metal liberated colours the paper. Other systems employ the electrode for depositing, by the corona effect, on a paper coated with a dielectric layer, local electric charges which permit the subsequent fixing of a colouring powder termed "toner". All these processes are poorly adapted to the reproduction of half-tones. Further, the dimension of the electrode point and the effects employed limit the fineness of the dots, and consequently the definition of the reproduced document, to values around 3 to 4 dots per mm.

It is further known in the art to employ layers of mesomorphic materials, also known as liquid crystals, and more particularly those of these materials which have a smectic phase, for displaying data transmitted in the form of a video signal.

In a patent entitled "Locally erasable thermo-optic smectic liquid-crystals storage displays" filed in the USA on Oct. 19, 1972 and issued on Mar. 12, 1974 under U.S. Pat. No. 3,796,999, F. J. Kahn proposed scanning a film maintained in a smectic phase by a beam of intensity-modulated infrared light. The film is initially in an ordered texture and therefore transparent. The heat energy communicated to the points of the film irradiated by the beam at its maximum intensity is sufficient to temporarily cause the smectic phase to pass to the isotropic liquid phase. In rapidly returning to the initial temperature corresponding to the smectic phase, these points assume a scattering macroscopically disordered texture termed focal conic structure. The data recorded in this way in the film remains stable for several hours; to erase it, the film is once more brought to the liquid phase, then slowly cooled until it reaches the smectic phase, in which it resumes a transparent ordered structure. The device does not lend itself well to the recording of half-tones and a large part of the energy of the luminous beam is lost in the modulator.

In the U.S. patent entitled "Erasable thermographic storage display of a transmitted image", filed by Michel Hareng, Serge Le Berre, and Erich Spitz on June 10, 1975 and issued on Aug. 2, 1977 under U.S. Pat. No. 4,040,047, it is proposed to insert the film in the smectic phase between two transparent electrodes between which the video signal is applied. An infrared beam of constant intensity scans the layer in synchronism with this signal. The scanned points are thus subjected, upon their cooling from the liquid phase to the smectic phase, to an electric field of variable intensity. The return of the film to an ordered structure does not occur for zero field and is all the more pronounced as the field is more intense. The video signal thus modulates the scattering power of the scanned points. This device provides a recording with half-tones and dispenses with the use of an electro-optical modulator. However, the obtainment of high recording speeds involves the use of highly directive and very powerful infrared sources; these sources and the accompanying beam deflectors moreover form large size expensive means.

Consequently, Michel Hareng and Serge Le Berre proposed, in the U.S. Patent entitled "Thermoelectric display cell for recording images line by line" filed on May 2, 1978 and issued on May 6, 1980 under U.S. Pat. No. 4,202,010 heating the mesomorphic film through parallel resistive lines to enable it to pass from the smectic phase to the liquid phase; the video signal is then applied to the film by a series of parallel electrodes disposed on the other side of the film in the form of columns perpendicular to the lines. The display is controlled by multiplexing; the successive lines are heated in turn, the video signal corresponding to the line of row n is sampled in as many samples as there are colunms, stored, and the various samples are simultaneously applied to the corresponding columns, during the interval of time during which the line of row n+1 is heated; the various signal voltages delivered by the columns of electrodes act on the orientation of the mesomorphic film only along the sole line passing from the liquid phase to the smectic phase, which is in fact the line n. The data recorded on a line lasts during the recording of all the other lines of the image and is erased only during the time of writing of the preceding line.

These various devices employing liquid crystals obviously lend themselves to the recording of telecopies, which recording is then indirect: a whole page of the document is first displayed in the smectic layer and afterwards projected onto a photosensitive surface. However, while the first two devices mentioned above enable an excellent definition of the transmitted document to be obtained, and even, in respect of the second device, half-tones to be reproduced, they employ, as mentioned before, expensive large size equipment. As concerns the latter device, its definition is limited by problems of connection owing to the large number of lines and columns. Moreover, neither of them lends itself well to the coupling with the transmitter part which is essential to any telecopy device.

The object of the present invention is to provide a telecopier which overcomes these drawbacks of the prior art and which, as it is both a transmitter and a receiver, is of low cost price and yet permits a reproduction of the documents transmitted with half-tones and a high definition.

This result is obtained, by associating in a single optical device, a bar of photodetectors for reading the document at the transmitting end and a bar of cells which employs a layer of mesomorphic material in smectic phase so as to display, upon recording, simultaneously a group of dots which are thereafter projected onto a photosensitive surface.

Further features and advantages of the invention will be clearly apparent from the ensuing description which is given by way of a nonlimitative example. In the accompanying Figures:

FIG. 1 is a diagrammatic view of the telecopier according to the invention:

FIGS. 2a, 2b, 2c represent the structure of intermediate display means constituted by a cell of a mesomorphic material in a first embodiment of the invention, namely respectively a diaphragm-slit deposited on the outer face of one of the plates of the cell, a transparent heating resistance disposed on the inner face of this plate, and P transparent electrodes disposed on the inner face of the other plate;

FIGS. 7a and 7b represent the structure of the display cell, namely the respective dispositions of Q heating resistances and of P×Q electrodes and multiplexing control means associated therewith in this second embodiment of the invention.

FIG. 1 is a diagrammatic representation of the transmitter-receiver telecopier according to the invention.

Figure 2A:
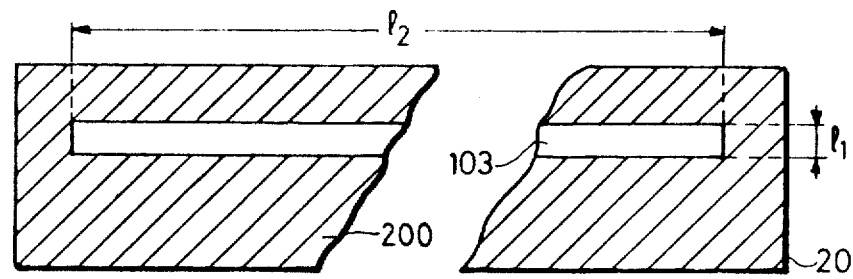

This device comprises, as optical and opto-electronic means:
illuminating means including a rectilinear source of light 100, a reflector 101, condenser 102 and a diaphragm-slit 103;
intermediate linear display means formed by a liquid crystal cell 11 disposed in the immediate vicinity of the diaphragm 103;
a linear mosaic of phtotodetectors 12 of dimensions identical to those of the diaphragm-slit 103;
projecting means comprising a fixed and semi-transparent planar mirror 130, a projection objective 131 provided with a variable diaphragm 132 and a planar mirror 133 which is movable about an axis 134 perpendicular to the plane of the figure:
a movable photosensitive surface 14;
means 15 for positioning the document to the photocopied.

The liquid crystal cell 11 is shown in FIG. 1 in a sectional view taken perpendicularly to its largest dimension. It comprises two parallel transparent solid plates 20 and 21 separated from each other by two spacer blocks 200 and 201. The space defined between the plates 20 and 21 and the blocks 200 and 201 is filled by a layer 3 of a mesomorphic material in a smectic phase. The references 3i and 3ij relate to two transparent conductive deposits provided on a part of the inner faces of the plates 20 and 21, one of which performs the function of a counterelectrode and heating resistance whereas the other is an electrode. The cell 11 comprises at least one group of P electrodes and at least one heating resistance.

By way of example, glass or sapphire may be employed for making the plates 20 and 21 and tin oxide ($SnO_2$) or indium oxide ($In\ O_2$), or a mixture of these two oxides, may be employed for the conductive deposits 3i and 3ij. The plates 20 and 2 are spaced apart 10 to 21μ. Good results are obtained by employing as the mesomorphic material compounds of the cyano-biphenyl family alone or as a mixture and in particular cyano-biphenyl (C.O.B.) of formula:

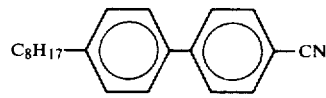

which has a smectic phase A between 20° C. and 32.5° C. and whose isotropic nematic-liquid transition occurs at 40°5. A thermostat device (not shown in the Figure) maintains, if need be, the mesomorphic material, in the absence of current in the heating resistance or resistances, at a temperature slightly below the smectic-nematic transition temperature. If required, the surfaces of the conductive deposits and of the plates in contact with the mesomorphic material may be treated by known processes to permit a spontaneous but relatively slow return of the latter to the transparent ordered phase; in particular, suitable surface-active agents may be employed, such as the product known under the name "Silane" which is in wide use and perfectly suitable when the mesomorphic material is the aforementioned C.O.B.

The source of light 100 is, for example, a source having a rectilinear filament disposed to be perpendicular to the plane of FIG. 1. The condenser 102 forms the image of the source 100 in the plane of the diaphragm 103. The planar mirror 133 may have its reflecting surface facing either the photosensitive surface 14 ("receiving" position shown in continuous line in FIG. 1) or the means 15 for positioning the document to be photocopied ("transmitting" position shown in dotted line) so as to project onto the plane of either of these surfaces the image of the diaphragm-slit 103 furnished by the objective 131.

The condenser 102 has a relatively low numerical aperture, for example f/6 or f/8. The numerical aperture of the objective 131 is determined by the diaphragm 132 whose aperture is related to the position of the mirror 133. When the mirror is in the "receiving" position, the aperture of the diaphragm 132 is just sufficient to allow through the luminous flux issuing from the condenser 102 after passing through the diaphragm-slit 103, in the absence of any diffusion produced by the cell 11. On the other hand, when the mirror 133 is in the "transmitting" position, the diaphragm 132 is wide open in order to allow the objective 131 to operate with a full aperture.

The photosensitive surface 14 may be formed by a paper covered with an argentic emulsion, for example a heat-developable paper. It may also be a layer of a photoconductive material, for example selenium or zinc oxide, employed in known electrostatic phoocopying methods. The device for developing, fixing and possibly transferring the recorded data is known per se and has not been shown in FIG. 1. The linear mosaic of detectors 12 is arranged symmetrically with the diaphragm-slit 103 relative to the semi-transparent mirror 130 and is consequently located, when the planar mirror 133 is in the "transmitting" position, in the conjugate plane of the document to be photocopied held in position by the positioning means 15.

The telecopier shown in FIG. 1 has also the following mechanical means:

- a mechanical modulator comprising a disc 104 provided with radial slits interposed, in the vicinity of the source 100, between the latter and the objective 102 and driven by a motor 105;
- a first drive system 106 for translating the unit comprising the illuminating means 100, 101 and 102, the modulator 104 and 105, the diaphragm 103, the cell 11, the semi-transparent mirror 130, the detector 12 and the objective 131. This displacement in a direction perpendicular both to the common optical axis of the objectives 102 and 131 and to the axis 134 of rotation of the mirror 133, enables the image of the source of light 100 seen through the diaphragm-slit 103 to be displaced either in the plane of the photosensitive surface 14 or in the plane of the positioning means 15, depending on the position of the mirror 133;
- a second drive system 135 for rotating the mirror 133 to enable it to occupy either of the aforementioned "receiving" and "transmitting" positions, both of which are at 45° to the common optical axis of the two objectives 102 and 131. If desired, the same drive system effects a continuous displacement or a step-by-step displacement of the mirror 133 on each side of the two mean positions defined hereinbefore so that the image of the source 100 sweeps the surfaces 14 or 15; the drive system 106 is then dispensed with since it performs the same function and is then useless;
- a third drive system for displacing the photosensitive surface 14. FIG. 1 concerns more particularly the case where the photosensitive surface 14 is an argentic emulsion disposed on a roll of paper 140, the sheet being progressively driven by two circular pressing means 141, 142 driven by motor 143; in the presently described embodiment, the surface 14 is displaced in a direction perpendicular to the image of the source 100 seen through the diaphragm-slit 103. In a modification of the invention, the surface 14 may also be displaced in a direction parallel to the image of the source 100. The photosensitive surface 14 may also be displaced in a direction parallel to the image of the source 100. The photosensitive surface 14 may also be arranged on a cylindrical surface rotating about its axis which is then disposed parallel to the image of the source; such an arrangement is useful in particular when a photoconductive material is employed according a known electrostatic copying method:
- a fourth drive system 15 for shifting the positioning means 15 in a direction perpendicular to the plane of the Figure;
- a system 136 for controlling the aperture of the diaphragm 132.

The device shown in FIG. 1 has a number of electronic circuits and in particular:

- a logic control unit 16 comprising a contactor having two positions, namely a "transmitting" position and "receiving" position and provided with a pilot clock; this unit controls the system 136 controlling the diaphragm 132 and, through the motor 135, the "transmitting" or "receiving" position of the mirror 133; the unit also delivers signals for synchronizing: when transmitting, the operation of the motors 106 or 135 for the luminous scanning of the document to be telecopied placed at 15, the movement of the motor 151 which shifts this document and the operation of the linear photodetector means 12; when receiving, the operation of the motor 105 driving the modulating disc 104, the operation of the motor 106 or 135 ensuring the luminous scanning of the photosensitive surface disposed at 14, the operation of the motor 143 for shifting this surface 14 and the operation of the cell 11;
- a reading control generator 170 receiving, in the "transmitting" stage, the control pulses from the logic unit 16 and controlling the reading of the linear mosaic of photodetectors 12; this control generator sends to the transmission line, through the channel of the amplifier 171, and a possible data compressing system, not shown in the Figure, the signal $S_L$ which comprises the data read by the detectors and the signals synchronizing the lines and the images;
- a selector amplifier 180 which receives and amplifies the signal $S_R$ coming from the transmission line and extracts therefrom the synchronization pulses sent to the logic 16;
- a sampling circuit 181, controlled by the logic unit 16, samples the video signal coming from the amplifier 180 in a series of distinct control voltage pulses having a constant frequency;
- a series-parallel converter 182, also controlled by the logic unit 16, which stores the successive pulses received from the sampling circuit 181 and simultaneously applies them at evenly-spaced intervals of time, in packets of P, to the groups of P electrodes, such as the electrode $3ij$ of the cell 11; the electrodes of row 1 of each group consequently receive simultaneously the first control voltage pulse $V_{C1}$ stored by the memory, the electrodes of row 2 the second $V_{C2}$... and the electrodes of row P the Pth pulse $V_{CP}$. If data compression is employed for the transmission of the document, the receiving part of the telecopier must comprise a buffer memory having two to three lines of minimum capacity. This buffer memory then constitutes the memory of the series-parallel converter 182;
- a heating pulse generator 190 which comprises as many outputs as there are heating resistances, such as $3i$, in the cell 11 so as to deliver to the latter, under the control of the logic unit 16, heating pulses $I_{C1}$ $I_{CQ}$ which are evenly spaced apart in time, in synchronism with the control voltage pulses applied to the electrodes.

FIGS. 2 to 5 relate to a first embodiment of the device shown in FIG. 1, which embodiment is more particularly adapted to operate with a conventional telephone network provided with a data compressing device. The essential feature of this first embodiment is that a group of P lines of the document to be telecopied is read and written in parallel.

Figure 2B:
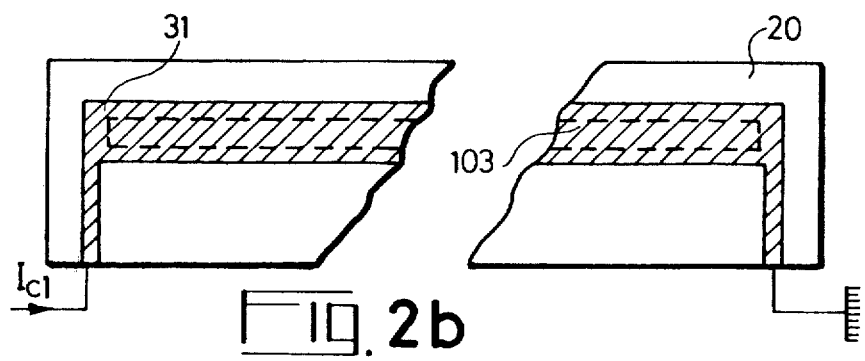
Figure 2C:
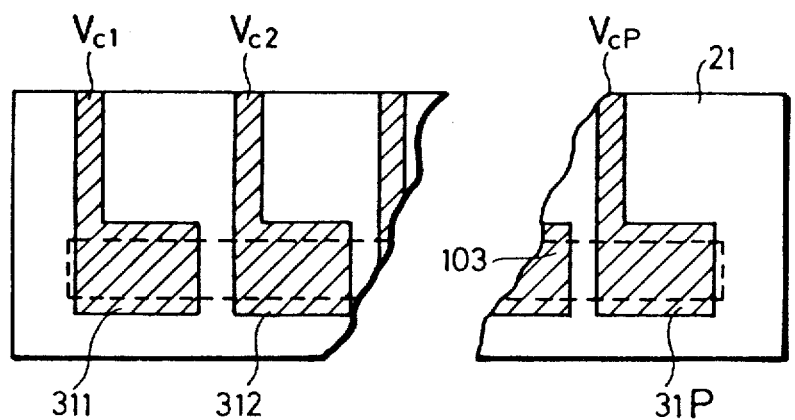

FIGS. 2a, 2b and 2c show the structure of the cell 11 and respectively represent the outer face of the plate 20, the inner face of this plate and the inner face of the plate 21.

As shown in FIG. 2a, the outer face of the plate 20, which constitutes the outer part of the cell facing the source of light 100, comprises an opaque coating 200 formed by a metallic deposit in which is formed a rectilinear slit 103 which leaves the surface of the transparent plate bare and constitutes the previously-mentioned diaphragm-slit designated by the same reference numeral in FIG. 1.

FIG. 2b shows the configuration of the transparent conductive deposit 31 deposited on the inner face of the plate 20 to constitute a single heating resistance; this deposit forms an elongated strip whose dimensions are slightly larger than those of the slit 103 disposed on the other face of the plate (shown in dotted lines in FIG. 2a) which slit it completely covers. One of the ends of the deposit 31 is connected to earth and the other end receives the pulses $I_{C1}$ delivered by the single output of the generator 190.

FIG. 2c shows the configuration of the transparent conductive deposits 311, 312 . . . 31P which constitute the single group of P identical electrodes arranged on the inner face of the plate 21. In this Fig., the position occupied by the slit 103 when the cell is assembled, is shown in dotted lines so as to permit locating the respective positions in the cell of the slit 103, the counter electrode heating resistance 31 and the electrodes 311 to 31P. It can be seen that these electrodes are provided throughout the length of the surface located in front of the heating resistance and are of substantially the same length as the latter. They receive simultaneously from the series-parallel converter 182 the control voltage pulses $V_{C1}, V_{C2} \ldots V_{CP}$.

Figure 3:
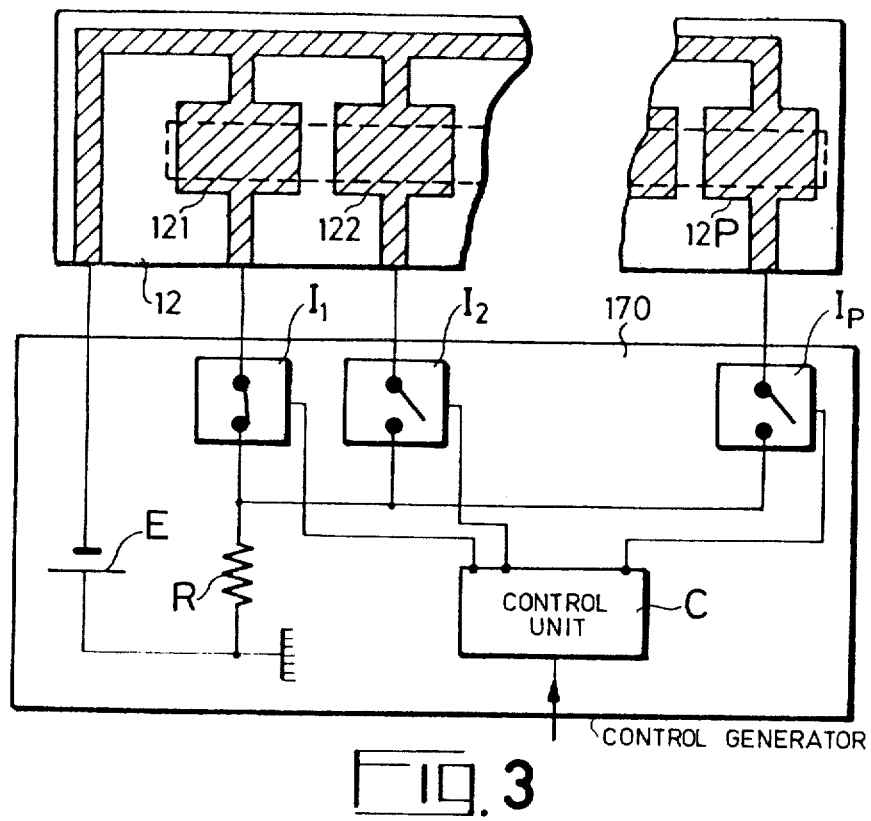
FIG. 3 represents the arrangement of P detectors constituting a linear mosaic of detectors and of the control generator associated with this mosaic in this first embodiment of the invention.

FIG. 3 shows the arrangement, in this first embodiment, of the linear mosaic of detectors 12 and of the reading control generator 170 associated therewith.

The mosaic 12 comprises P identical and aligned photoconductive detectors 121, 122 . . . 12P, namely as many elements as there are electrodes 311 . . . 31P in the cell 11. The dotted lines represent the image at magnification 1, of the diaphragm-slit 103 projected in the plane 15 by the objective 131 and reprojected by this objective and the semi-transparent mirror 130 in the plane of the linear mosaic 12. The sensitive surfaces of the detectors are aligned so as to cover the whole of this image.

The control generator 170 comprises a source of voltage E connected to a common terminal of the detectors, P switches $I_1, I_2 \ldots I_p$, each of which permits connecting to earth, through a common load resistor R, the other terminal of the corresponding detector to a control unit C initiating, as a function of the signal received from the logic unit 16, the temporary successive closure of each switch. The reading signal, taken from the upstream side of the resistor R, is sent to the input of the amplifier 71.

The telecopier according to this first embodiment operates in the following manner:

Putting the logic unit 16 in the "transmissing" position triggers a heating pulse applied to the heating resistance 31; the heat given off temporarily brings the layer 3 of mesomorphic material from the smectic phase to the isotropic liquid phase; during the subsequent return of the layer 3 to the smectic phase, the logic unit 16 triggers through circuits 181 and 182, P identical control voltage pulses of maximum value which are applied to the P electrodes 311 . . . , 31P of the cell and produce the uniform orientation of the layer 3 for an indefinite time. The cell 11 is then uniformly transparent.

Simultaneously, the logic unit 16 has put the modulator 104 in a stationary position to allow through the light from the source 100, fully opened the diaphragm 132, put the mirror 133 in the "transmitting" position, then initiated the scanning of the document placed at 15 by starting up either the motor 106 or the motor 135, depending on the chosen version.

Figure 4:
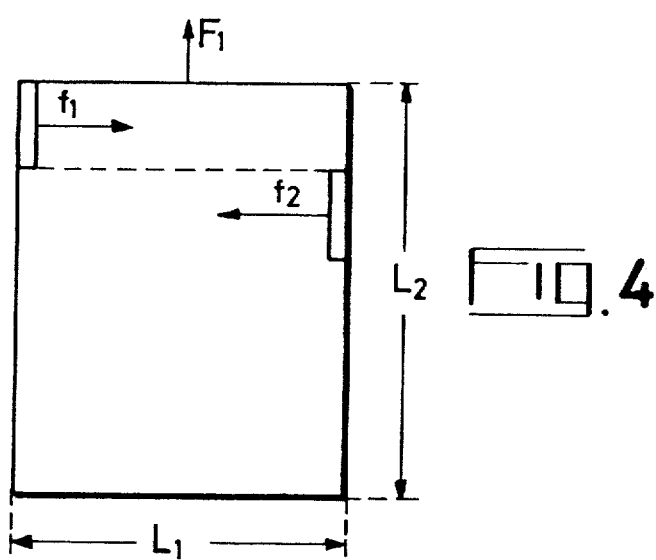
FIG. 4 is a diagram showing how a page of the document to be telecopied is read in this first embodiment of the invention.

The image of the source 100, projected by the condenser 102, illuminates the diaphragm-slit 103 whose image is projected by the objective 131 and the mirror 135 onto the document to be photocopied disposed in the positioning means 15. As shown in FIG. 4, the luminous line formed illuminates the upper left corner of the document to be telecopied and sweeps it with a continuous movement in the "lines" direction from the left to the right as indicated by arrow $f_1$. When the luminous line has reached the extreme right edge, the logic unit 16 starts up the step-by-step motor 151 which shifts the positioning means 15 in the direction indicated by the arrow $F_1$, namely the "columns" direction, a length equal to that of the luminous line and then reverses the movement of the motor 106 or 135; the line sweeping then occurs in the opposite direction indicated by arrow $f_2$. The two alternating movements continue until the luminous line has scanned the whole of the page.

The objective 131 reforms, by means of the semi-transparent mirror 130, the image of the illuminated part on the linear mosaic of detectors 12. The resistance of each element is modulated as a function of the illumination received, which depends on the degree of absorption, relative to the luminous radiation, of the corresponding point of the document to be transmitted disposed in the plane 15. The control generator 170 permits the successive reading, always in the same order, of the variations of resistance of the photoconductors 121 . . . 12P, which appear in the form of voltage variations at the terminals of the resistor R. These variations, amplified by the amplifier 171, constitute the transmitted signal $S_L$. The reading of the matrix requires a time $t_1$, namely $t_1/P$ per element, If $l_1$ is the width of the diaphragm-slit 103 and g the linear magnification of the objective 131, there will be adopted as the speed v of displacement of the luminous line in the plane 15:

$$v = g \cdot l_1 / t_1.$$

A page of the document of width $L_1$ and length $L_2$ is thus scanned in the form of $N_L N_C$ independent dots, the number of dots per line $N_L$ and of lines per page being respectively:

$N_L = L_1 / g \cdot l_1$;

$N_C = P \cdot L_2 / g \cdot l_2$;

($l_2$ being the length of the diaphragm-slit 103). P lines of the document are thus read simultaneously. The time taken by the device for reading simultaneously the P lines is:

$$T_L = t_1 L_1 / G l_1$$

and the time for reading a page:

$$T = t_1 L_1 L_2 / G^2 \cdot l_1 l_2$$

Putting the logic unit 16 in the "receiving" position closes the diaphragm 132 to the minimum aperture size and puts the mirror 133 in the "receiving" position. A "start of reading" pulse delivered by the reading telecopier starts up the motor 105 of the mechanical modulator 104 and the motor 106 or 135 for scanning the photosensitive surface 14.

The signal $S_R$ received by the amplifier 180, and then broken up into pulses of frequency $P/t_1$ by the sampling circuit 181, is stored by the series of P pulses in the series-parallel converter 182.

Figure 5:
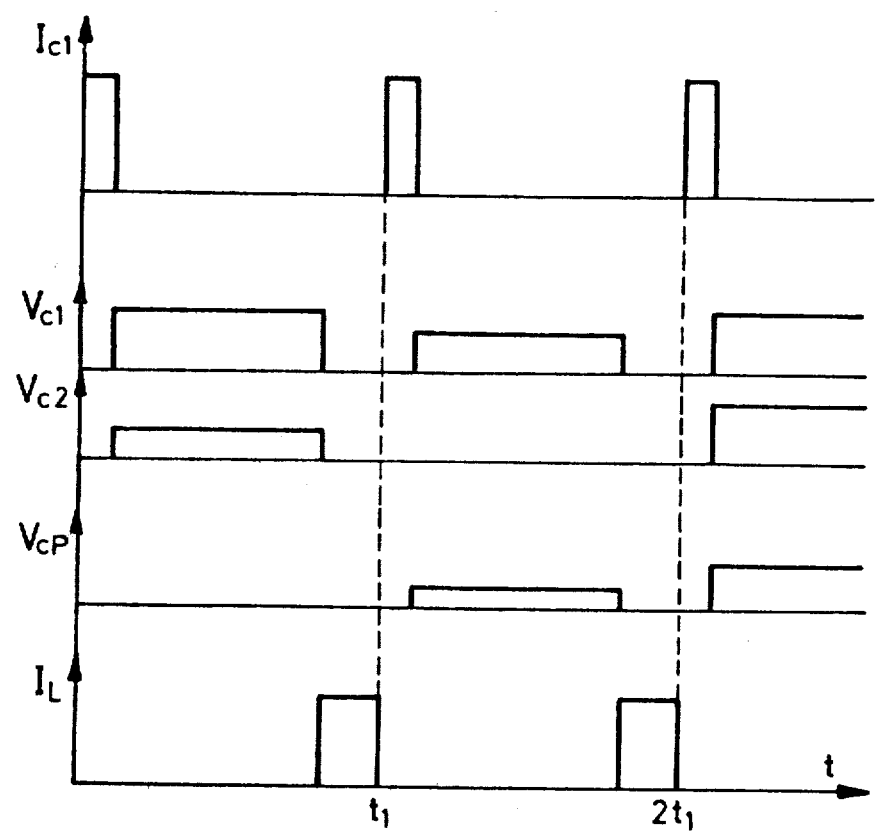
FIG. 5 is a diagram showing the synchronization of the control voltage heating and light pulses in the first embodiment of the invention.

The diagram of FIG. 5 shows how this converter 182 applies these pulses to the electrodes of the cell 11 in synchronism with the heating pulses and the luminous pulses under the control of the logic unit 16. It represents as a function of time t:

in the upper part, the heating pulses $I_{C1}$ applied by the heating pulse generator 190 to the terminals of the heating resistance 31;

in the intermediate parts, the control voltage pulses $V_{C1}, V_{C2}, \ldots V_{CP}$ applied by the series-parallel converter 182 to the electrodes 311, 312, ... 31P;

in the lower part, the variations in the luminous intensity $I_L$ received in the region of the diaphragm-slit 103 coming from the source of light 100 through the modulator 104.

The generator 190 sends to the resistance 31, at frequency $1/t_1$, a heating pulse of duration $t_1/r$ (where r is greater than 1) which, in causing the layer 3 to pass from the smectic phase to the isotropic liquid phase, erases any previously recorded information.

As soon as this pulse has finished, the converter 182 simultaneously applies each of the previously-stored P pulses to the P electrodes 311, ... 31P which consequently receive control voltages respectively proportional to the signals delivered by the detectors 121, 122, ... 12P of the mosaic 12 of the transmitter telecopier. These pulses are applied at frequency $1/t_1$ for a duration: $mt_1/r$ (where m is greater than 1 and less than r).

As the heating resistance and counter-electrode 31 is then connected to earth, the electrodes produce, in the corresponding elements of the mesomorphic layer 3 all of which pass from the liquid phase to the smectic phase, electric fields which are proportional to the voltage applied to the corresponding electrode; a field lower than a threshold value causes the return to an disordered smectic structure which is consequently scattering, and the maximum field causes the return to an ordered structure which is consequently transparent. The linear cell 11 thus reproduces, in the form of variations of the coefficient of diffusion, the variations of luminosity of the column element of the document transmitted such as they are measured by the mosaic 12 of the transmitter telecopier. These variations of the coefficient of diffusion remain until they are erased by the following heating pulse.

When the control voltage pulses have stopped, the mechanical modulator 104 unmasks the source of light 100 which illuminates the diaphragm-slit 103. Those of the elements of the layer 3 which are in an ordered smectic phase, and therefore nondiffusive, do not modify the path of the incident luminous beam the whole of which passes through the diaphragm 132; the oints of the photosensitive layer 14 which are the images of these elements receives the maximum illumination. On the other hand, the more the structure of the elements of the layer 3 is disordered the more these elements are diffusive and the larger the fraction of the luminous flux originating from the diaphragm-slit 103 which is sent outside the aperture of the diaphragm 132 (which aperture, as previously mentioned, is in the "receiving" position and is just sufficient to allow through the nondiffused flux); consequently, the photosensitive layer receives so much less luminous energy as the corresponding element of the intermediate display means, constituted by the cell 11, is more diffusive. The luminous pulses, which also repeat at a frequency $1/t_1$, have a duration $(r-m-1)t_1/r$.

Each luminous pulse permits the recording by the photosensitive surface of a column portion comprising P points. After $N_L$ pulses, P consecutive lines of the document transmitted have thus been recorded. A line synchronization pip coming from the transmitter starts up the step-by-step motor 143 which advances the photosensitive surface 14 a length equal to that of the image of the P spots forming the column portion. The scanning motor 106 or 135 then reverses its direction of operation for the recording of the following P lines. Contrary to that shown in FIG. 1, the displacement of the photosensitive surface 14 occurs in a direction perpendicular to the plane of the Figure.

By way of a practical example, the diaphragm-slit 103 has a rectangular aperture of width $l_1 = 25 \cdot 10^{-3}$ mm and length $l_2 = 100$ mm. The number of electrodes 311, ... 31P and photodetectors 211, ... 21P is then P=20, their width is 30 μm, their length (oriented in the direction of the length of the slit 103) 45 μm, the space between two consecutive electrodes being 5 μm. The heating resistance 31 has a length of 1.05 mm, a width of 30 μm; the quotient of its resistivity divided by its thickness has a value RO=12Ω; the resistance of the element 31 is therefore around 400Ω. The heating pulses have a frequency of 1000 Hz, namely t=1 ms; the duration of the heating, the control voltage and the light pulses are respectively 0.1 ms (r=10), 0.7 ms (M=7) and 0.2 ms. The objective 131 operates with a magnification g=5.

Under these conditions, a typewritten page of format 21×27 sq cm is transcribed with a high definition of $N_L = 1,680$ dots/line and $N_C = 1,080$ lines/page, namely a total of $1.8 \cdot 10^6$ dots/page. Bearing in mind that the device permits the writing of a column portion of 20 spots within 1 ms, the writing of a whole page requires about 90 s. This writing rate is compatible with the rate transcription of a normal telephone line (2,400 bauds) operating with a data compression without transmitting the half-tones.

Figure 6:
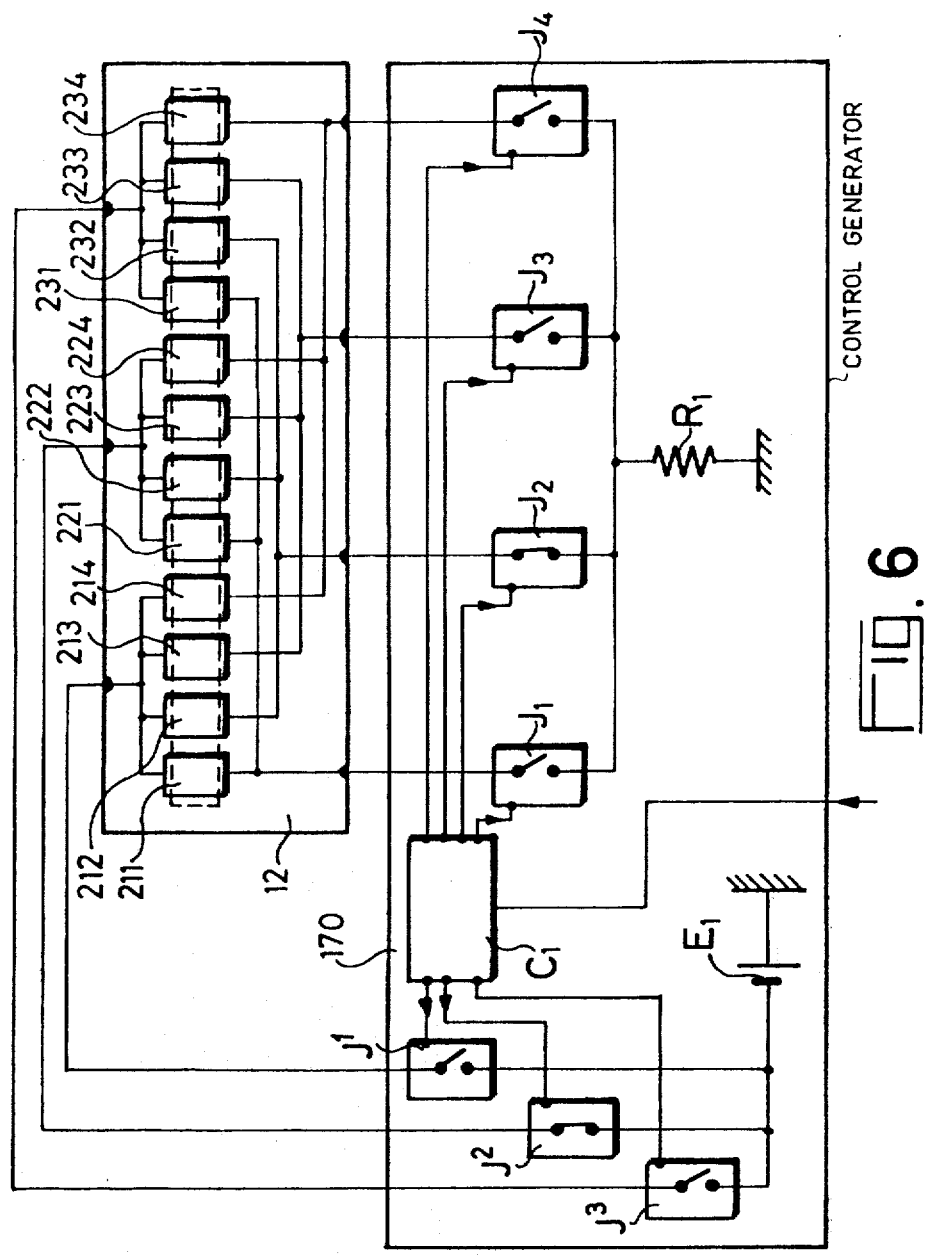
FIG. 6 represents the arrangement of P×Q detectors constituting a linear mosaic of detectors and of the reading control generator employing multiplexing associated with the mosaic in a second embodiment of the invention.

FIGS. 5 and 6 relate to a second embodiment of the invention whereby it is possible to obtain a transmitted document having a definition which is as high as the first embodiment but with higher speed. This device is designed to be coupled with a high-rate data transmission line. The cell 11 of FIG. 1 is designed to display a complete line of the transmitted document; this cell and the linear mosaic of detectors 12 are then controlled by multiplexing.

FIG. 6 relates to the "transmitter" part of the device and shows the arrangement of a linear mosaic of photodetectors comprising Q groups of each P photoconductors where in order to simplify the description, the values of P and Q have been reduced to P=4 and Q=3. It also shows the diagram of the associated control generator 170 which effect the reading of the photoconductors by multiplexing.

The 12 detectors 211 to 214, 221 to 224 and 231 to 234 are aligned and evenly spaced apart in order to cover the image of the diaphragm-slit 103 furnished, as in the first embodiment, by the objective 131 and the semitransparent mirror 130. The first terminals of the photoconductors of the same group 211 to 214, 221 to 224 or 231 to 234 are interconnected; the three groups of first terminals are connected through three distinct lines to the same pole of a voltage generator $E_1$ through three switches $J_1$, $J_2$ and $J_3$ which are electrically controlled by a control unit $C_1$, piloted by the signal from the logic unit 16. The switches $J_1$, $J_2$, and $J_3$, the generator $E_1$ and the control unit $C_1$ are part of the control generator 170; also part thereof are four other switches $J_1$, $J_2$, $J_3$ and $J_4$, which are also electrically controlled by the unit $C_1$, and a common load resistor $R_1$. The second terminals of the photoconductors of row 1 of each group, namely the photoconductors 211, 221 and 213, are interconnected and have their output connected to the resistor $R_1$ through the switch $J_1$; the same is true of the second terminals of the photoconductors of row 2: 212, 222 and 232 connected through the switch $J_2$, those of the photoconductors of row 3: 213, 223 and 233 connected through the switch $J_3$ and those of the row 4: 214, 224 and 234 connected through the switch $J_4$. The signal read by the photoconductors is taken from the upstream terminal of the resistor $R_1$ and sent to the input of the amplifier 171.

As the length of the diaphragm-slit 103 and the magnification g of the objective 131 were calculated to ensure that the image of the slit 103 covers one line of the document to be telecopied, the linear mosaic 12 permits the reading of the whole of this line spot-by-spot. For this purpose, the unit $C_1$, which maintains solely switch $J^1$ closed, controls the closure, during equal intervals of time of successively the switches $J_1$, $J_2$, $J_3$ and $J_4$. The same sequences are reproduced with $J^2$ closed, and $J_1$, $J_3$ open, then $J_3$ closed and $J_1$, $J_2$ open, in such manner that all of the photoconductors of the mosaic have their outputs successively connected to the resistor $R_1$.

The passage to the reading of the following line then occurs either by displacing the image of the diaphragm-slit 103 by a step-by-step movement of the motor 151; in this case, in contrast to that which is indicated in FIG. 1, the translation of the positioning means 15 occurs in the plane of the Figure in a direction parallel to the common optical axis of the objectives 102 and 131. As soon as the translation has been effected, the same cycle of the reading of the photodetectors of the mosaic 12 is reproduced. These alternating actions: spot-by-spot reading of a line-translation to the following line, are repeated until the complete reading of the page.

FIGS. 7a and 7b concern the receiver part of the telecopier and respectively show the arrangement of the heating resistances and of the electrodes on the inner faces of the plates 20 and 21, and the diagram of the connections for controlling them.

FIG. 7a shows, in a simplified version, the configuration of the transparent conductive deposits on the inner face of the plate 20. These deposits form $Q=3$ distinct resistances 32, 31 and 33 placed end-to-end and covering the whole of the area of the diaphragm-slit 103; the latter is disposed, as in the first embodiment and according to FIG. 2a, on the outer face of this plate. Each resistance has one of its terminals connected to earth; leading to the other three terminals are three distinct lines 301, 302 and 303 conveying the heating pulses $I_{C1}$, $I_{C2}$ and $I_{C3}$ coming from the heating pulse generator 190.

FIG. 7b shows, in the same simplified version, the transparent conductive deposits on the inner face of the plate 21 performing the function of electrodes 3ij. As in FIG. 7a, and in order to facilitate the understanding of the device, the diaphragm slit 103 facing them have been shown in dotted lines in this Figure. The cell comprises $Q=3$ groups of $P=4$ electrodes each of which is identical: 311 to 314, 321 to 324 and 331 to 334; the electrodes of the same group, for example the electrodes 321 to 324, are disposed in facing relation to the same resistance, namely the electrode 32. The dimensions and the pitch of the electrodes are identical to the dimensions and the pitch of the sensitive surfaces of the photodetectors constituting the linear mosaic shown in FIG. 6.

The electrodes of row j of the 3 groups: 31j, 32j and 33j, are connected to a common line 34j connected to one of the output terminals of the series-parallel converter 182 for receiving the control voltage pulses $C_{Vj}$; thus the three electrodes of row 3: 313, 323 and 333 are connected to the single line 343 for receiving the pulses $V_{C3}$.

The writing of a line of row n on the photosensitive surface 14 is effected as follows. There will be taken as the departure instant the moment when the line of row $n-1$ written in the cell 11 in the form of $P \times Q$ distincts spots (namely 12 spots in the case of the simplified version represented in FIGS. 6, 7a and 7b) has just been projected onto the surface 14. The heating pulses $I_{C1}$, $I_{C2}$, $I_{C3}$ have all the same duration $t_1$ and succeed one another at the frequency $1/t_1$. The heat given off by each pulse in the corresponding resistance temporarily puts the adjacent portion of the layer 3 in the isotropic phase and erases the information which was previously recorded therein.

The duration $t_1$ of the first heating pulse $I_{C1}$ applied to the resistance 31 is utilized for displacing by the space between two consecutive lines, either the image projected onto the surface 14 owing to a step-by-step movement of the motors 106 or 135 or the photosensitive surface 14 itself by a step-by-step movement of the motor 143, depending on the chosen version of the device. While the second heating pulse $L_{C2}$ is applied to the resistance 32, the series-parallel converter 182 simultaneously applies, during a time $t_1$, to the four lines 341 to 344 the control voltage pulses $V_{C1}$ to $V_{C4}$, which are, in this order, the first four pulses sampling the corresponding video signal at the start of the line n. The same signal, for example $V_{C1}$, is thus applied to three different electrodes: 311, 321 and 331; but only the voltage applied to the electrode 311 modifies the optical properties of the adjacent portion of the layer 3; indeed, only the portion of the layer 3 facing the resistance 31 is in the cooling stage changing from the liquid phase to the smectic phase. The first four signals are thus recorded solely in the portions of the layer 3 between the heating resistance 31 and the electrodes 311 to 314. As explained before, the recording is effected in the form of variations of the scattering coefficient, the scattering being the more pronounced as the control voltage pulse is weaker and being maintained so long as the element is not once more brought to the liquid phase.

More generally, the P control pulses simultaneously delivered by the converter 182 to the group of electrodes during the duration of the heating pulse applied to the resistance 3j act on the liquid crystal solely in the region of the resistance $3(j-1)$. The time $t_1$ must be sufficient to permit:

on one hand, upon reception of the voltage pulse, the possible putting of the molecules of the mesomorphic material in order so as to counter, upon the cooling during the nematic-smectic transition, the spontaneous establishment of a scattering disordered texture;

on the other hand, a sufficient cooling of the layer to prevent the subsequent voltage pulses from exerting their orienting action.

Values of $t_1$ of around 0.5 ms satisfy this double requirement when the aforementioned C.O.B is employed as the mesomorphic material with a thickness of around 10 microns.

When the whole of the line has been recorded in accordance with the procedure described herein before, which procedure has required the time $Qt_1$ (namely $3t_1$ in the described simplified version), the modulator 104 shows the source 100 for a sufficient duration $t_2$ to permit the photosensitive layer 14 to record the line n intermediately displaced by the cell 11. An identical cycle is then reproduced for the recording of the line of row n+1.

By way of an example of application of this second type of embodiment of the device according to the invention, there may be adopted for the diaphragm-slit 103 a width $l_1=60$ μm and a length $l_2=52.5$ mm, the objective 131 operating with a magnification 4. The number of heating resistances is $Q=36$ spaced apart from each other 5μ and having a value $RQ=10\Omega$. Superimposed on each resistance are $P=48$ electrodes measuring 65 μm by 25 μm spaced 5 μm apart from each other. A page measuring 21 cm b 27 cm is thus reproduced in the form of 1,200 lines of $P=Q=1,728$ dots/per line by a cell requiring only $P+Q=84$ inputs.

By adopting for $t_1$ a value of 0.5 ms and for $t_2$ a value of 1 ms, the total duration of the writing of a line is 19 ms, namely 23 s for the writing of a page. With reference to the mean characteristics of sensitivity of heat-developable papers having a argentic coating, it is found that it is possible to employ for the source 100 a lamp having a tungsten filament the power of which is around 50 watts. The mean power dissipated by the resistive elements of the cell is around 30 watts.

Without departing from the scope of the present invention, it is possible to disperse within the mesomorphic material particles having a privileged direction of absorption of light, the orientation of which is controlled by that of the mesomorphic material in accordance with French patent application filed on Dec. 3, 1976 by the Applicant under application No. 76 36 532 and entitled "Liquid crystal cell". The variations of the coefficient of diffusion of the mesomorphic layer 3 are then reinforced by variations in the coefficient of absorption, which permits using objectives 102 and 131 which are wider and dispensing with the diaphragm 132.

What we claim is:

1. A telecopying process for inscribing each transmitted page in the form of successive rectilinear segments of N dots wherein the writing-in of each segment comprises the following steps:
   a step of intermediate writing-in of the N dots, in rectilinear alignment in a layer including a mesomorphic material having a smectic phase, in the form of Q successive under segments of P simultaneous dots, the product P×Q being equal to N and Q being integer at least equal to one; the intermediate writing-in of each under-segment being preceded by a temporary heating of the part of the layer intended for receiving said intermediate writing-in from a first temperature in the range where said material is in smectic-phase to a second temperature higher than this range and being accomplished during the subsequent cooling of this same part from the second to the first temperature;
   a step of definitive writing-in during which the meomorphic material is uniformly in smectic phase, and the Q under segments intermediately recorded in said layer are simultaneously projected onto a layer of a photosensitive material.

2. A transmitter-receiver telecopier comprising:
   a layer of a mesomorphic material having a smectic phase and enclosed between two transparent plates;
   Q aligned rectilinear transparent identical resistive elements arranged on the inner face of one of said plates, each for transitorily raising the temperature of the part of the layer facing that element by a heating electric pulse;
   Q sets, each of P transparent identical control electrodes, aligned on the inner face of the other plate, each set facing one resistive element;
   heating pulses generating means for generating, sequences of Q identical heating pulses having a fixed recurrence period and equally spaced in time and delivering the pulses successively to each of the resistive elements;
   control pulses generating means for storing a video-signal for transmitting the document to be telecopied by asuccessive sets of P consecutive dots and restoring it in the form of sequences of the same period as that of the heating pulses; each sequence comprising Q successive sets of P simultaneous control pulses; these control pulses having the same frequency as the heating pulses; the control pulse of row i of the same set being simultaneously applied to each electrode of row i of the Q sets of control electrodes;
   control means operating the heating and control pulses generating means in order that a sequence of control pulses of row n be delivered with a constant delay equal to at least the duration of a heating pulse, in relation with the sequence of heating pulses of same row and that a constant space of time take place between the end of the sequence of control pulses of row n and the start of the sequence of heating pulses of row n+1;
   illuminating means for projecting a luminous flux onto the layer during said space of time;
   projecting means for receiving at least part of the luminous flux having crossed the layer and forming an image of the latter;
   photosensitive means for recording this image; and
   moving means for providing the relative displacement of this image with respect to photosensitive means.

3. A telecopier as claimed in claim 2, wherein the illuminating means and the projecting means are usable for projecting the image of a part of the document to be transmitted onto a linear mosaic of photoelectric detectors.

4. A telecopier as claimed in claim 2, wherein the mesomorphic material contains a dispersion of particles of a second material having a privileged direction of absorption of light the orientation of which is controlled by that of the mesomorphic material.

* * * * *